(12) United States Patent  (10) Patent No.: US 8,756,571 B2
Bergman et al.  (45) Date of Patent: Jun. 17, 2014

(54) NATURAL LANGUAGE TEXT INSTRUCTIONS

(75) Inventors: Ruth Bergman, Haifa (IL); Alexei Lenedev, Nes-Ziona (IL); Omer Barkol, Haifa (IL); Ayelet Pnueli, Haifa (IL); Michael Pogrebisky, Rishon le-Zion (IL); Sagi Schein, Haifa (IL); Marianne Hickey, Bristol (GB); Inbal Tadeski, Ramat-Gan (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 946 days.

(21) Appl. No.: 12/776,043

(22) Filed: May 7, 2010

(65) Prior Publication Data

US 2011/0276944 A1   Nov. 10, 2011

(51) Int. Cl.
*G06F 9/44* (2006.01)

(52) U.S. Cl.
USPC .......................... 717/124; 717/125; 717/127

(58) Field of Classification Search
None
See application file for complete search history.

(56) References Cited

U.S. PATENT DOCUMENTS

| | | | | |
|---|---|---|---|---|
| 4,688,195 | A * | 8/1987 | Thompson et al. | 706/11 |
| 5,197,005 | A * | 3/1993 | Shwartz et al. | 706/11 |
| 5,794,050 | A * | 8/1998 | Dahlgren et al. | 717/144 |
| 6,076,088 | A * | 6/2000 | Paik et al. | 1/1 |
| 6,246,989 | B1 * | 6/2001 | Polcyn | 704/275 |
| 7,216,351 | B1 * | 5/2007 | Maes | 719/328 |
| 7,337,158 | B2 * | 2/2008 | Fratkina et al. | 706/45 |
| 7,389,236 | B2 * | 6/2008 | James | 704/275 |
| 7,493,597 | B2 * | 2/2009 | Hefner | 717/125 |
| 7,624,007 | B2 * | 11/2009 | Bennett | 704/9 |
| 7,685,576 | B2 * | 3/2010 | Hartmann et al. | 717/125 |
| 7,809,570 | B2 * | 10/2010 | Kennewick et al. | 704/257 |
| 7,823,138 | B2 * | 10/2010 | Arguelles et al. | 717/125 |
| 7,886,273 | B2 * | 2/2011 | Hinchey et al. | 717/127 |
| 7,917,895 | B2 * | 3/2011 | Givoni et al. | 717/124 |
| 7,949,529 | B2 * | 5/2011 | Weider et al. | 704/270 |
| 7,958,495 | B2 * | 6/2011 | Kelso | 717/124 |
| 7,958,497 | B1 * | 6/2011 | Lindo et al. | 717/128 |
| 7,979,295 | B2 * | 7/2011 | Kaiser | 705/7.22 |
| 8,140,335 | B2 * | 3/2012 | Kennewick et al. | 704/257 |
| 8,171,460 | B2 * | 5/2012 | Pizzoli et al. | 717/124 |
| 8,195,468 | B2 * | 6/2012 | Weider et al. | 704/275 |
| 8,301,757 | B2 * | 10/2012 | Catlin et al. | 717/127 |
| 8,347,267 | B2 * | 1/2013 | Givoni et al. | 717/124 |
| 8,392,886 | B2 * | 3/2013 | Sweis et al. | 717/124 |
| 8,522,083 | B1 * | 8/2013 | Cohen et al. | 717/125 |
| 8,606,538 | B2 * | 12/2013 | Cahon et al. | 717/127 |
| 2002/0032564 | A1 * | 3/2002 | Ehsani et al. | 704/235 |
| 2004/0103396 | A1 * | 5/2004 | Nehab | 717/127 |
| 2006/0026537 | A1 * | 2/2006 | L'Heureux | 715/863 |

(Continued)

OTHER PUBLICATIONS

Froeseth, "A model for voice-activated visual GUI editors", Thesis for Master of Science, University of South Alabama, 2005; [retrieved on Dec. 19, 2012]; Retrieved from Internet <URL:http://www.isecon.usouthal.edu/share/Daigel/TOF%20Candidates%202007/Freseth%20December%202005.pdf>;pp. 1-140.*

(Continued)

*Primary Examiner* — Xi D Chen

(57) ABSTRACT

A computer can display a graphical user interface (GUI) that includes a control. The GUI can receive text instructions in a natural language that describe a location of the control on the GUI. The text instructions can instruct an application to perform a user interface (UI) event on the control.

20 Claims, 12 Drawing Sheets

(56) References Cited

U.S. PATENT DOCUMENTS

| | | | | |
|---|---|---|---|---|
| 2008/0115107 | A1* | 5/2008 | Arguelles et al. | 717/124 |
| 2008/0313575 | A1* | 12/2008 | Wilson | 715/863 |
| 2011/0202901 | A1* | 8/2011 | Givoni et al. | 717/125 |
| 2011/0246969 | A1* | 10/2011 | Lee et al. | 717/127 |
| 2013/0097586 | A1* | 4/2013 | Chandra et al. | 717/124 |
| 2013/0263089 | A1* | 10/2013 | Banerjee et al. | 717/124 |

OTHER PUBLICATIONS

Bindiganavale et al., "Dynamically Altering Agent Behaviors Using Natural Language Instructions", 2000, ACM; [retrieved on Dec. 17, 2012]; Retrieved from Internet <URL:http://dl.acm.org/citation.cfm?id=337503>;293-300.*

Funatsu et al., "Action Generation from Natural Language", 2004, Springer-Verlag Berlin Heideberg; [retrieved on Dec. 17, 2012]; Retrieved from Internet <URL:http://link.springer.com/content/pdf/10.1007%2F978-3-540-30543-9_3>;pp. 15-22.*

James, Roelands, "Voice over Workplace (VoWP): Voice Navigation in a Complex Business GUI"; 2002, ACM; [retrieved on Dec. 18, 2012]; Retrieved from Internet <URL:http://dl.acm.org/citation.cfm?id=638285>;pp. 197-204.*

Takenobu et al., "Bridging the Gap between Language and Action"; 2003, Springer-Verlag Berlin Heidelberg; [retrieved on Dec. 17, 2012]; Retrieved from Internet <URL:http://link.springer.com/content/pdf/10.1007%2F978-3-540-39396-2_21>;pp. 127-135.*

Ogden, Bernick, "Using Natural Language Interfaces"; 1996, Elsevier Science Publishers B.V.; [retrieved on Dec. 17, 2012]; Retrieved from Internet <URL:http://gate.ac.uk/sale/dd/related-work/1997+Ogden+and+Bernick+Using+NLls.pdf>;pp. 1-33.*

Schmandt, et al., "Augmenting a Window System with Speech Input", 1990 IEEE; [retrieved on May 2, 2013]; Retreived from Internet <URL: http://ieeexplore.ieee.org/stamp/stamp?jsp?tp-&arnumber=56871>;pp. 50-56.*

Nguyen, et al., "Model-Based Testing of Multiple GUI Variants Using the GUI Test Generator"; 2010 ACM; [retrieved on Feb. 4, 2014]; Retrieved from Internet <URL:http://dl.acm.org/citation.cfm?id=1808270>;pp. 24-30.*

Nguyen, et al., "Automated Functionality Testing through GUIs"; 2010 ACM; [retrieved on Feb. 4, 2014]; Retrieved from Internet <URL:http://dl.acm.org/citation.cfm?id=1862199>;pp. 153-162.*

Kantorowitz, et al., "A Use Case-Oriented User Interface Framework"; 2003 IEEE; [retrieved on Feb. 4, 2014]; Retrieved from Internet <URL:http://ieeexplore.ieee.org/stamp/stamp.jsp?tp=&arnumber=1245429>;pp. 1-8.*

Givens, et al., "Exploring the Internal State of User INterfaces by Combining Computer Vision Techinques with Grammatical Interface"; 2013 IEEE; [retrieved on Feb. 4, 2014]; Retrieved from Internet <URL:http://ieeexplore.ieee.org/stamp/stamp.jsp?tp=&arnumber=6606669>;pp. 1165-1168.*

* cited by examiner

NATURAL LANGUAGE TEXT INSTRUCTIONS

BACKGROUND

A designer of a software application has extensive domain knowledge about the application while a developer has extensive technical knowledge about the application. During development and testing of the software application, a quality assurance (QA) specialist tests the application. The QA specialist has expertise in testing and simulating the application. This person, however, is often neither the designer nor the developer and lacks the knowledge of the concepts and the internal implementations of the software application.

DETAILED DESCRIPTION

Figure 1:
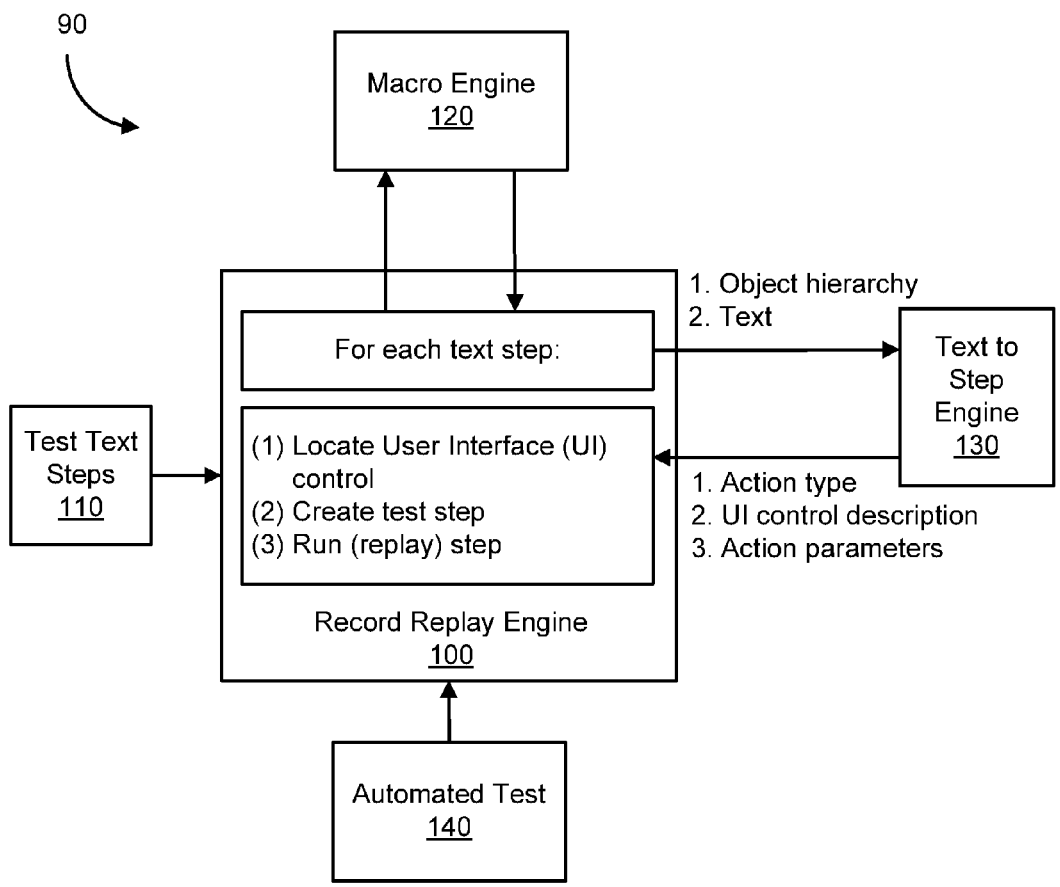
FIG. 1 shows a diagram of software testing application and algorithms in accordance with an example embodiment.

Example embodiments relate to apparatus and methods that use natural language to test software applications. One embodiment is a software testing application that tests software applications for quality assurance.

Example embodiments include methods and systems for automated software testing in which tests are written in a natural language. In order to test functionality of a software application, users write text in natural language and/or record a test being performed on the software application. Testing can be performed through various development stages of the application, from requirement setting and design, through development, testing, and deployment. These stages also include a debugging phase during which the user can refine object descriptions based on guidance from the system.

Overview

During a planning stage of a new software application, designers plan and develop tests that will be used to test the application once it is developed. Such tests, however, eventually run on the application executable. For applications that use a Graphical User Interface (GUI), running tests includes activating User Interface (UI) components, such as buttons, links, and text edit boxes. The translation of tests designed at the planning stage into an actual test that runs on that GUI is not a trivial task.

In addition, for existing applications, organizations commonly have manual test procedures, written in natural language and stored as text documents. IT organizations benefit by converting such manual test procedures to automatic software tests. This conversion is complex and probably cannot be accomplished in a fully automatic manner, but can be partially automated by the ability to translate text commands into a replayable test.

As used herein and in the claims, "user interface" or "UI" is an interface, location, and/or system by which users (humans) interact with a machine (e.g., a computer or electronic device). The UI includes hardware (physical) and software (logical) components that provide input to allow a user to manipulate the machine and/or output to allow the machine to indicate the effects of the manipulation of the user.

Automated software testing can use a record/replay paradigm in which the software tester or quality assurance (QA) specialist records a sequence of steps that test a particular functionality of the application. The recorded sequence of steps can then be replayed and/or viewed.

Software testing begins when application requirements are set, or possibly during application design. The test in accordance with example embodiments includes a natural language description of the steps required to accomplish the business transactions or processes that support the application being tested. Execution of the test is automatic once the application is implemented. Alternatively, tests are recorded from user actions, such as in a functional testing product; and the recorded test is stored in natural language.

In example embodiments, software testers create and modify the software for testing applications with natural language tests. This facilitates a testing paradigm in which the designer, the developer, and the software tester share responsibility for testing the software application. As explained below, natural language tests describe the objects that the user manipulates semantically rather than refer to specific objects of the application (e.g., the a text instruction in natural language describes a location of a control on a web page without referring to a name of the control).

In example embodiments, descriptions of objects consist of semantic information and are in a language that is intuitive for a person to follow. At the same time, the implementation of objects is identified (e.g., with a replay engine). The software testing application is comprehensible by the developer, the designer, and the QA specialist.

Example embodiments uniquely identify objects that the software testing application references from a natural language description. Visual clues about an object assist in providing this description. For example, assume a web page has a first search box at a top of the web page and a second search box at a bottom of the web page. To perform a search for "software testing" in the first box, the user would say "enter software testing in the search box at the top of the page." By contrast, to perform the same search in the second box, the user would say, "enter software testing in the search box at the bottom of the page."

Object Model

The object model describes each type of object with which the user can interact (e.g., buttons, text boxes, text, radio buttons, links, etc.). Each type of object is associated with several properties. For example, a button has a name, and a text box has a name and a value. To support record/replay, the object model does not need to include objects that the user cannot interact with, such as a disabled button.

The model also describes the allowed actions for each object type. For example, a user can click on a button and type or enter text in a text box. The text value for the text box is specified for a type or enter action, not for a click.

Semantic Hierarchy

Example embodiments are independent of an implementation of the software testing application. Rather than using an object hierarchy of the implementation, the software testing application uses a semantic hierarchy. The semantic hierarchy includes information needed for each object visible in the application, as well as the correct inclusion relationship and other spatial relationships. For example, such relationships include the specific location of the object in the visual interface and a relative location to other objects, such as next-to, to the right of, above, below, near, adjacent, to the left of, on top of, etc.

The semantic hierarchy is more suitable for describing and identifying objects than internal object hierarchies that contain primarily rendering information. Semantic information may be displayed, but not connected to the relevant object. For example, in Hyper Text Markup Language (HTML), a text box is an input element, and it may contain a name, but is not required to contain a meaningful name. Typically, a meaningful name appears near the text box for ease-of-use. In the semantic hierarchy, the meaningful name next to the text box is a property of the text box object.

Example embodiments infer the semantic hierarchy from screen images of the application, and this inference enables the software testing application to function in various environments that are independent of the implementation of the application being tested. In order to infer the object hierarchy from an image, one embodiment uses one or more of the following:

(1) an image segmentation to locate a layout component of the application and the components of the GUI;
(2) object recognition to classify each component as one of the GUI components of interest (e.g., button, text box, radio button, etc.); and
(3) hierarchical analysis using, for example, graph grammars to construct a hierarchy with the correct semantics. This analysis makes use of the spatial relationships of the objects and known rules about how GUIs are laid out.

Additional information can also be used to construct the semantic hierarchy, when such information is available. Some examples of additional information include, but are not limited to, information from the internal representation of the objects (e.g., Document Object Model, Java Swing API or .NET API), and changes in the application due to user interaction.

Natural Language Test

As used herein and in the claims, "natural language" is a human written or human spoken language (as opposed to a computer language) that is ordinary or everyday language.

As used herein and in the claims, a "natural language test" is a test that implements a restricted set of natural language constructs. On the one hand, the grammar for natural language tests should be as close to human or natural language as possible, but, on the other hand, it should be well defined in order to generate tests that are executable on a computer. The grammar for natural language tests includes, but is not limited to, one or more of the following:

(1) Nouns that represent basic and common GUI controls (e.g., buttons, text fields, sliders, scroll bars, etc.).
(2) Verbs that are applicable to controls (e.g., click, press, drag, type, enter, etc.).
(3) Testing primitives to verify that the automation steps produce the desired results.
(4) Spatial Relations—prepositions supported: in, inside, next to, to the left of, to the right of, above, below, under, over, adjacent, etc.
(5) Ordinals that are used to select the correct object among those that match a description.

In an example embodiment, the grammar is extensible to support new more complex/composite controls (e.g., in-place editable grids, calendars, accordion panels, etc) and to support application specific grammar. An application specific grammar construct is similar to a "function" in programming. For example: "Fill Order" with order details can be implemented with reusable parameterized text which is composed from basic nouns and verbs. For example, the function below includes a named sequence of actions with parameters. Use of the parameters in the body of the function is preceded by the keyword input.

Statement Fill Order with parameters item, count, date, name

```
{
    Open the New Order window
    Select the input item from the Items listbox
    Enter input count to the quantity text field
    Select the input date in the Due Date field
    Enter input name in the customer text field
    Press the Submit button
}
```

This function can then be used in another test using natural language: "Fill order with parameters napkins, 100, Nov. 15, 2010, Ruth Bergman".

In one example embodiment, a natural language parser uses a thesaurus to allow some flexibility in the written text. For example, click, press and select all correspond to click actions. As another example, textbox, text box, text field, field, and box correspond to a textbox.

One embodiment uses language independent tests that are stored in a semantic representation, rather than as text. The semantic representation is independent of any particular natural language and enables users to work in their own language (e.g., various different languages). When the test is accessed, it is rendered into the natural language of choice using natural language generation. The test can then be edited in natural language, and natural language understanding parses it back to the internal semantic representation.

Personal Database

To enable more flexible tests, an example embodiment uses a database containing personal information. By replacing specific user information with a reference to this database, multiple users can use an automation that was created by any other user. In addition, the database enables information security. For example, consider a login automation that includes the following steps:

(1) Enter john.smith@gmail.com
(2) Enter abc123

This login would be replaced by the following:

(1) Enter your "gmail address"
(2) Enter your "gmail password".

Testing Automation

Example embodiments are applicable to a variety of use cases. As one example, the user or tester records a script and then the software testing application is repeatedly replayed. As another example, the test is written entirely in natural language. As yet another example, the script is partially recorded and partially written.

To support all these use cases, the software testing application includes a tool in which the user can edit the test. In an embodiment, this tool is a text editor that supports various functions in addition to editing. For example, the tool confirms that the text has been parsed correctly. If the text cannot be parsed, the tool makes plausible suggestions to help the user enter something that will be parsed. The tool additionally informs the user whether a text-based test instruction is ambiguous or incomplete and provides a helpful response (e.g., "Did you mean the GOOGLE™ search box or the YOUTUBE™ search box?").

Once the test instruction is parsed correctly, a grammar parser translates the natural language description of a test statement to an internal language independent description. This internal description includes one or more of the following: an action type, a model of the object on which the action is performed (e.g., object type, keywords, and ordinal), context for the object (e.g., spatial relationship with another object), and data for the action (e.g., text value to enter in a text box).

Recording a Natural Language Test

When the test is recorded, the steps of the test are stored in the internal language independent test representation. For each step, a natural language description is generated and displayed to the user.

Replaying the Test

In replaying the test, example embodiments correctly identify the objects that are referred to by the script. The object identification algorithm searches for an object matching the internal description in the current interface. A matching object has the same object type, matching keywords, the same context and the same ordinal.

The more semantic information example embodiments have about the visual interface, the more natural the description of the context of the object. Because keywords are extracted to describe the object, this description does not have to be identical to the internal description. This feature enables a person to write a test without being versed in the implementation details. In addition, the test is robust to changes to the implementation.

Text-based software application tests are more general as they are implementation independent. As used herein and in the claims, "implementation independent" means not only independent of the internals of the implementation such as software architecture, programming language etc. but also independent of the specific GUI that was design to serve the application (e.g., issues of look-and-feel of the GUI).

FIG. 1 shows a diagram of software testing application and algorithms 90 in accordance with an example embodiment. A record replay engine 100 couples to and/or is in communication with test text steps 110, a macro engine 120, a text to step engine 130, and an automated test 140. Test text steps 110 enter the record replay engine 100, and for each text step, the replay engine provides the text and object hierarchy to the text to the step engine 130. The text step engine, in turn, locates the UI control, and provides the action type, UI control representation, and action parameters to the record and replay engine 100. Then the record/replay engine creates a test step, and runs (replays) the step.

Figure 2:
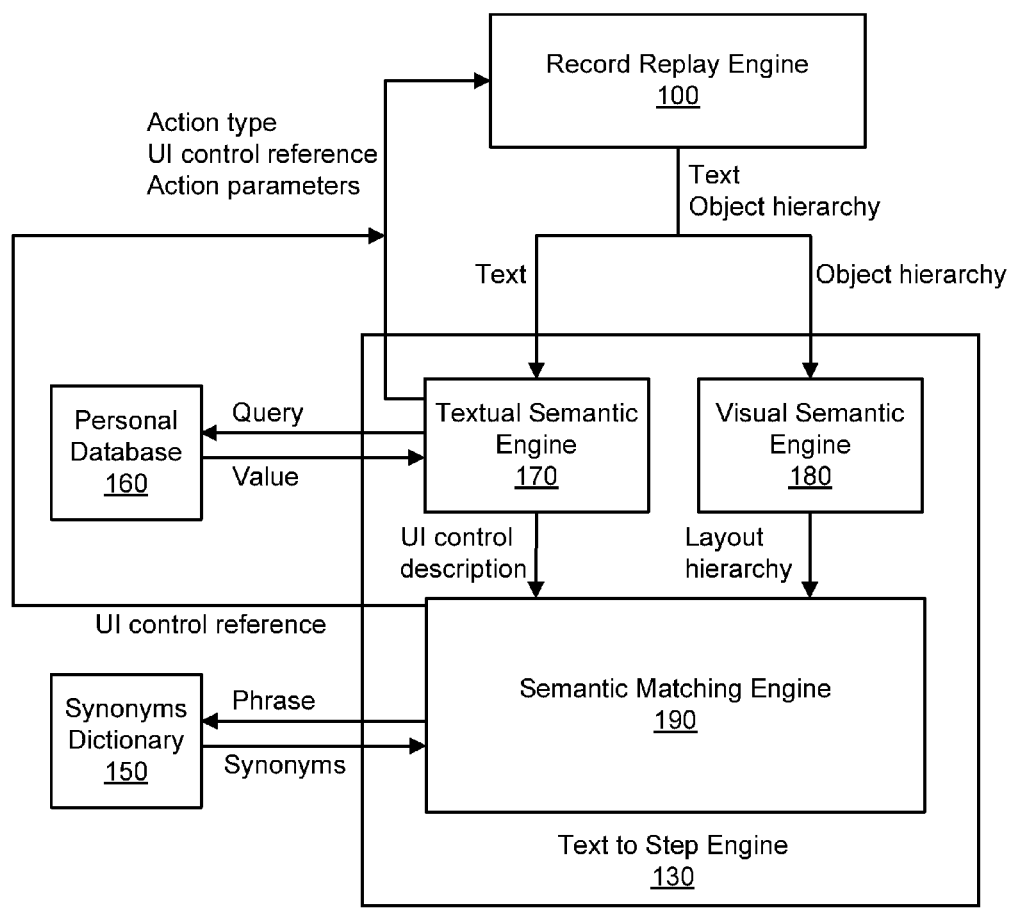
FIG. 2 shows a diagram of text to step engine architecture and algorithms in accordance with an example embodiment.

FIG. 2 shows a diagram of text to step engine architecture and algorithms in accordance with an example embodiment. The text to step engine 130 couples to and/or is in communication with a synonyms database 150, a personal database 160, and the record replay engine 100. As shown, the text to step engine 130 further includes a textual semantic engine 170 and a visual semantic engine that couple to and/or are in communication with a semantic matching engine 190.

As shown in FIG. 2, the record replay engine 100 transmits the object hierarchy to the visual semantic engine 180 which, in turn, generates and transmits the semantic hierarchy to the semantic matching engine 190. The record replay engine 100 transmits the text to the textual semantic engine 170 which, in turn, generates and transmits the UI control description to the semantic matching engine 190. In turn, the semantic matching engine 190 generates and transmits the UI control reference to the record replay engine 100, while the textual semantic engine generates and transmits the action type and action parameters to the records replay engine 100. Furthermore, the textual semantic engine 170 generates and transmits a query to the personal database 160 which, in turn, generates and transmits the value for the query back to the textual semantic engine 170. The semantic matching engine 190 generates and transmits a phrase to the synonyms dictionary 150 which, in turn, generates and transmits the corresponding synonyms back to the semantic matching engine 190.

FIGS. 1 and 2 and the corresponding algorithms are discussed more fully below. By way of illustration, the discussion is based on a java script record with the record replay engine 100 implementing web applications. In this example embodiment, the object hierarchy is a Document Object Model (DOM) provided by a web browser. A unique "path" to the location of the element in a DOM tree is output as a UI control reference. The DOM is an example implementation for the web environment. Other examples include the use of Extensible Markup Language (XML), such as to pass the object hierarchy between the replay engine and the text step engine.

To assist in this discussion, the following words are defined below.

As used herein and in the claims, a "Document Object Model" or "DOM" is a cross-platform and language-independent convention that represents and interacts with objects in Hyper Text Markup Language (HTML), XHTML, and XML. Aspects of the DOM (such as its "elements") are addressed and manipulated within the syntax of the programming language in use.

As used herein and in the claims, a "text step" is a literal description of a user interface (UI) action.

As used herein and in the claims, a "test step" is an object containing a description of the UI control the action is related to, the action type, and parameters. For example: Text step="write hello in the search box". In this example, test step=a reference to the page search text box control; action type=type; and parameters=the value "hello".

As used herein and in the claims, a "control" is an interactive user interface element. Controls include, but are not limited to, an input or dialogue box, check box, radio button, drop down list (combo box), button, hyperlinks, menu, etc. displayed on a computer or electronic device. A button is an example of a control that does not contain data. Controls can includes labels (e.g., static text) that describe the control (e.g., the term "text box" appearing adjacent a text box).

In cases of various ways to describe a control, the description in an example embodiment is as close as possible to the original description. For example, if the test describes a control by its ordinal place in a list, the description would not reference the specific control by its label and vice versa. Furthermore, the description can include a collection of identifiers in which their intersection leads to the correct UI control. The original text description itself can also be an identifier and can be used in replay if other identifiers fail to uniquely identify an object.

As used herein and in the claims, an "object hierarchy" contains the hierarchy of the UI controls of the web page. Each UI control is represented by attributes including one or more of identification (ID), name, title, type, rectangle, visible, etc.

As used herein and in the claims, a "layout hierarchy" represents the relations between the controls with respect to their layout (location, size, visibility). Layout hierarchy describes visual containment or adjacency of different controls.

The textual semantic engine 170 receives an input as a text step and generates an output as user action details: action type, action parameters, object type, related UI control literal description, and context objects (if exist). An example rule engine is a Context Free Grammar parser.

The textual semantic engine 170 also identifies locations where a personal value is injected and queries the personal database 160 component to retrieve this value (discussed more fully below).

By way of example, the text "write hello in the search box" is parsed using the following rules:

```
TypeAction = TypeVerb Value IN TextNounDescription ContextDescription*;
TypeVerb = TYPE | WRITE;
TextNounDescription = [Ordinal] Description* TextNoun+;
TextNoun = TEXT | BOX | TEXTBOX1 | TEXTBOX2;
ContextDescription = ContextPreposition [Ordinal] Description* ElementNoun+;
....
```

In one embodiment, the input text has the form of a limited number of templates. A parse is implemented for a restricted language which can analyze a limited set of possible step formats. It can be extended by natural language analysis techniques for less restricted languages.

The visual semantic engine 180 receives input as the object hierarchy and generates as output the layout hierarchy. This layout hierarchy represents the relations between the controls with respect to their layout (location, size, and visibility) and describes visual containment or adjacency of different controls.

Figure 3:
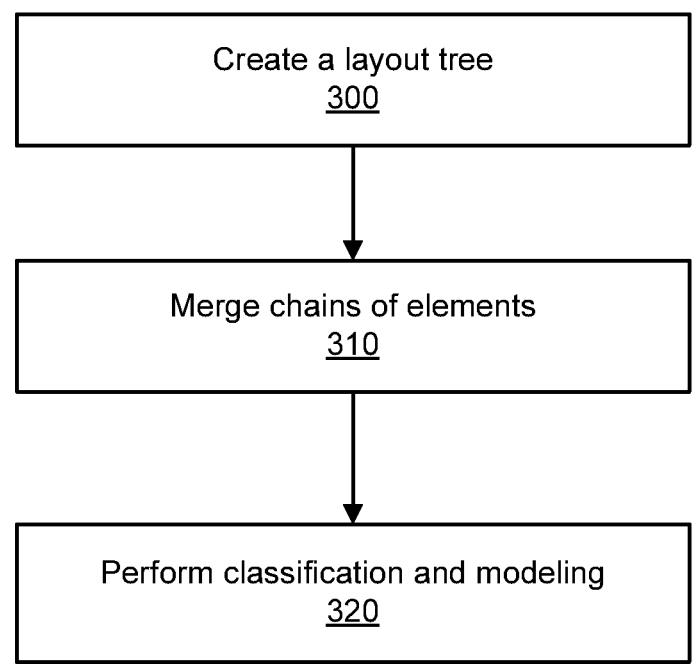
FIG. 3 shows a method for a visual semantic engine in accordance with an example embodiment.

FIG. 3 shows a method or algorithm for the visual semantic engine.

According to block 300, a layout tree is created with the following rules: a node's parent node is its visual container. Visual "neighbors" are also neighbors in the tree, ordered by their visual location from top to bottom and from left to right. The layout tree contains only visual elements.

According to block 310, merge chains of elements that visually appear like one control into one element which aggregates the data from the whole chain.

According to block 320, perform classification and modeling. Here, identify the type of each element and model it according to the type. In this stage, construct the key words that describe each element.

An example implementation of this embodiment is object hierarchy in a web application. This embodiment uses tag names of elements and other heuristics based on the elements properties to classify and model the elements (e.g., heuristics to identify headers, tabs, and meaningful containers). Due to the complexity of Rich Internet Applications, DOM mining techniques are used in an example embodiment for identification of components. For example, a frequent tree discovery algorithm identifies application-specific controls. Such techniques improve an ability to find meaningful containers, improve the "merge" stage, and assist in identifying headers of repeated components.

Example implementations and embodiments are not limited to web applications. For example, applications of the visual semantic engine 190 can be widened by using a verity of mechanisms to create semantic understanding. Examples include, but are not limited to, rhythms, and layout of a page as follows:

(1) Rhythms: list and tables discovery. This improves modeling capabilities, such as identifying tables, lists and list items. For example, in a step such as "select the first result" in a search results page it will improve the ability to identify the result items, which are often constructed from several components (labels, links, date, sub results etc.).

(2) Layout of the page. This improves the ability to identify meaningful containers and identify headers of such containers.

The semantic matching engine 190 has input as layout hierarchy and UI control description and output as a unique reference to the UI control in the object hierarchy (see definition of "test step"). This engine is responsible for finding a UI control that corresponds to a description of the control.

Figure 4:
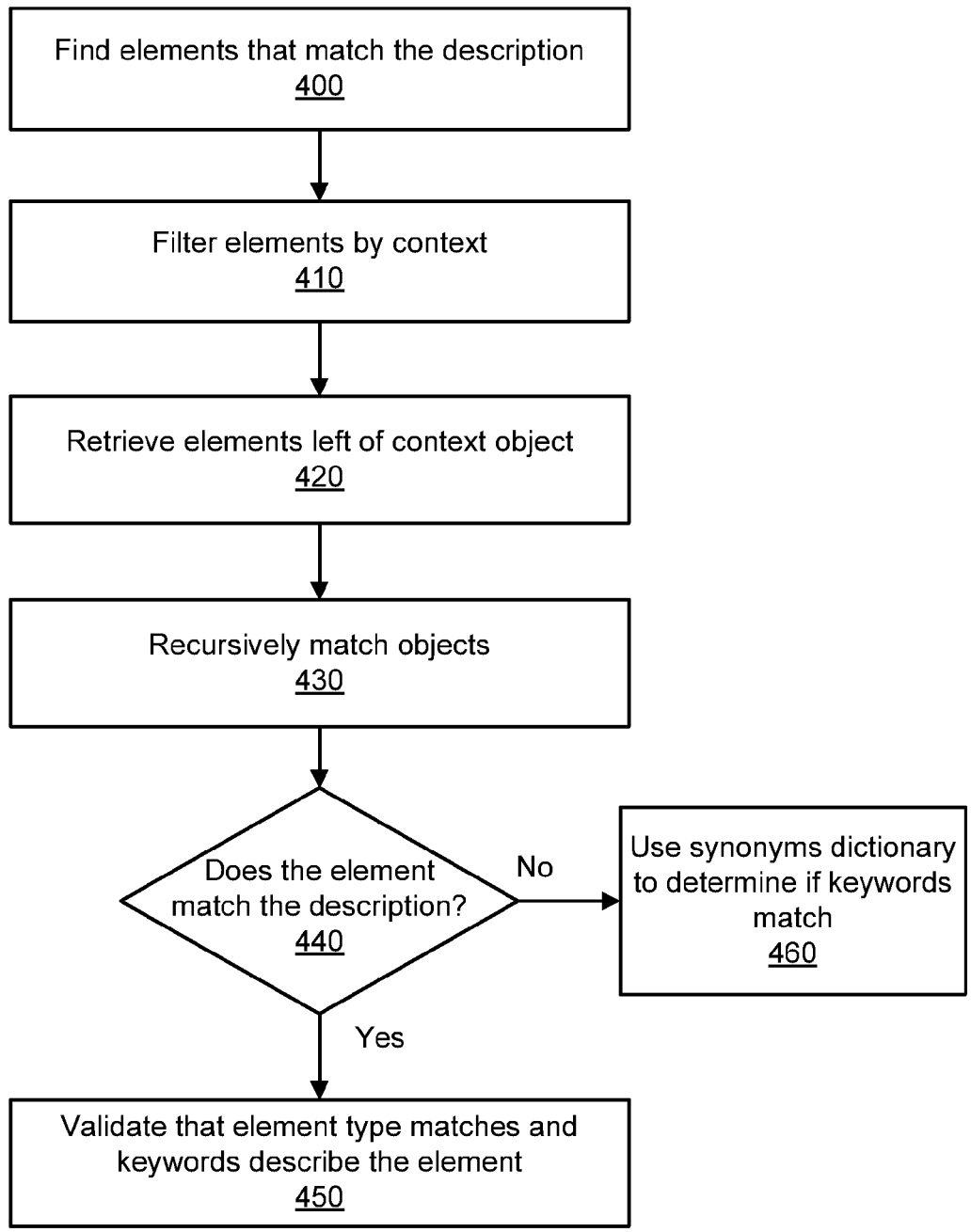
FIG. 4 shows a method for a semantic matching engine in accordance with an example embodiment.

FIG. 4 shows a method or algorithm for the semantic matching engine.

According to block 400, find elements that match the description. Elements are filtered by context (context objects are the type of element being matched), and identify context objects by the textual semantic engine. Recursively match the object (elements, object description). If a match is not found, then match by adjacent elements that match the keyword. Search an object of a different type (e.g., a label) that matches the description and search the objects around it. Next, return the ordinal element according to the ordinal value identified by the textual semantic engine (if no ordinal value is mentioned it will return the first one). More complex implementation can use soft decision making (i.e., rating each match using some metric and sorting the returned elements by their rate).

According to block 410, the elements are filtered by context (context objects, element type). For each context object, perform the following: If context preposition is "inside" then return elements inside context object (matches element type). Otherwise, if context preposition is "left" then return elements left of context object.

According to block 420, retrieve elements left of context object as follows (an example for filtering context):

```
retList <- [ ]
prevBrothers <- previous brothers of element in reverse order
for each brother in prevBrothers
    if brother is left of element and they overlap vertically
        retList.add(brother and all its children recursively that match
            elementsType, ordered from right to left)
retList.add(getElementsLeftOf(element.parent)
return retList.
```

According to block 430, recursively match the objects (elements, description) as follows:

```
retList <- [ ]
for each element in elements
    if element matches the description (described below)
        retList.add(element);
    for each element in elements
        retList.add(recursivelyMatchObject(element.children)).
```

According to block 440, a determination is made as to whether the element matches the description.

According to block 450, if element matches the description, then validate that element type matches. Furthermore, validate that the keywords describing the element (i.e., that were constructed by the visual semantic engine 180 in the stage of classification and modeling) match the key words in the description of the element.

According to block 460, if the elements do not match the description, then consult the synonyms dictionary 150 to determine whether the keywords are synonyms and thus match.

The synonyms dictionary 150 receives input as a phrase or word and outputs one or more synonyms for this phrase. The synonyms dictionary assists in the matching stage by overcoming gaps between the text terminology and the application terminology. By way of example, one embodiment uses a combination of a global dictionary of synonyms and a dedicated dictionary that is specific for a relevant business.

The macro engine 120 receives input as a text step and generates output as a list of text steps.

As used herein and in the claims, a "macro" is a set of text steps grouped together to one short text step. For example, the text steps "write hello in the search box" and "click on the search button" can be grouped to the text step "search for hello".

Before the text is sent to the text to step engine 130, the text passes the macro engine 120 which tries to match the text to one of the existing macros. If a match is not found, then the macro engine outputs the original text. If a match is found, then the macro engine analyzes the macro, retrieves the parameters values, and outputs the detailed list of steps, replacing the parameters with their values.

By way of example, the macro can be: "search for <param1>" and the detailed steps are: "write <param1> in the search box", "click on the search button". If the input text is "search for hello" it will set param1=hello and replace it in the output steps with the value. An example implementation is matching that uses regular expressions.

The personal database 160 receives input as a query (an application identifier, a field name) and generates output as a value. It is possible to add text steps that are general to multiple users, and personalize the text step in runtime by filling some of the details (values, descriptions) from a personal database that each user maintains locally. For example, assume each user maintains a list of user names and passwords to different applications. A user can create a "login" macro that takes the username and the password to fill in the login form from this list, instead of creating a different login macro for each user and each application.

Figure 5:
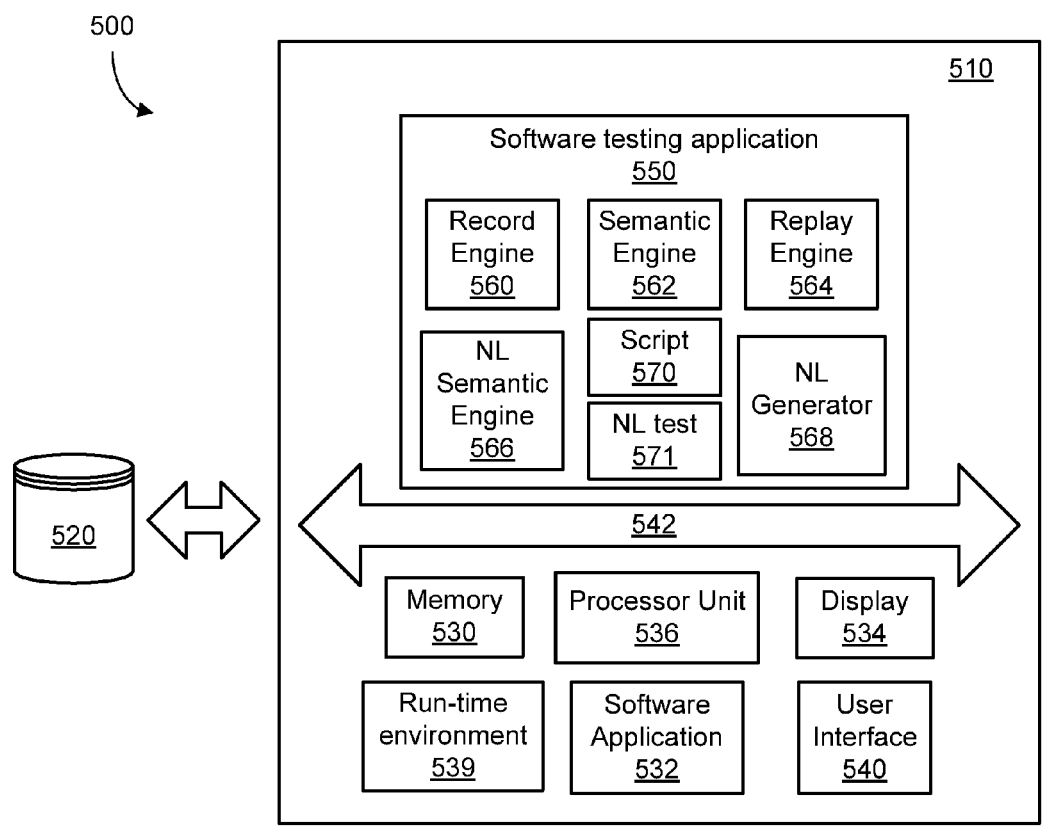
FIG. 5 shows a computer system in accordance with an example embodiment.

FIG. 5 shows a computer system 500 in accordance with an example embodiment. The computer system includes one or more computers or servers 510 coupled to one or more storage devices, databases, or warehouses 520. The computer 510 includes memory 530, a software application 532 (e.g., the software application being designed and/or tested in accordance with example embodiments), a display 534, a processor unit 536, a run-time environment 539 (e.g., a browser or any operating system including Windows, Linux, Mac, etc.), a user interface (UI) 540, and one or more buses, connections, or links 542.

The computer 510 also includes a software testing application 550 in accordance with example embodiments. The software testing application 550 can include modules, algorithms, and/or one or more of the various elements discussed in connection with FIGS. 1-4 in accordance with example embodiments. By way of illustration, the software testing application 550 includes a record engine 560, a semantic engine 562, a replay engine 564, a natural language (NL) semantic engine 566, a semantic matching engine 568, a script 570, and a NL test 571.

The processor unit includes a processor (such as a central processing unit, CPU, microprocessor, application-specific integrated circuit (ASIC), etc.) for controlling the overall operation of memory 530 (such as random access memory (RAM) for temporary data storage, read only memory (ROM) for permanent data storage, and firmware). The processing unit 536 communicates with memory 530, software application 532, display 534, run-time environment 539, UI 540, and software testing application 550 to perform operations and tasks necessary for executing the methods explained herein. The memory 530, for example, stores applications (such as applications 532 and 559), data, modules, programs, algorithms (including software to implement or assist in implementing example embodiments) and other data.

The natural language test (NL test) 571 is a record of the text descriptions that were provided to the software testing application. The script 570 is comprised of a hierarchy of test objects with associated actions that are broken down to primitive actions (e.g., a click is a mouse down followed by a mouse up action). A test object is represented as a collection of attribute-value pairs with some attributes being used for every test object (e.g., name, type, etc.).

The semantic engine 562 receives an object representation as input (e.g., DOM) and generates a semantic hierarchy as output. The semantic engine applies rules to the input object representation. The rules prescribe known object structures, and assign meaning to these structures.

The record engine 560 receives semantic hierarchy and user action as input and generates test object and action on the object as output. The algorithm finds the object in the semantic hierarchy that the user acted on. In one embodiment, a DOM Application Program Interface (API) has a built in function to find the object. In another embodiment, for every leaf in the input hierarchy, the algorithm checks if the location of the action is within the object.

The replay engine 564 has a test object with action and semantic hierarchy as input. The algorithm finds the test object in the input hierarchy. Initially every object in the hierarchy on which the test action is applied is a candidate. The algorithm iterates over attributes of the object until the number of candidates is one. If the candidate attribute does not match the test object attribute, then the candidate attribute is removed from the candidate pool.

The semantic matching engine 568 receives the test object (and action) and semantic hierarchy as input and generates a reference to the UI control as output. The algorithm identifies the object within the hierarchy by matching the input test object description to the objects in the semantic hierarchy. The UI control reference, which it outputs, is used by the run-time environment to access and manipulate the object in the application. For example, given the input object description "<type:textbox> <title:google>" and the semantic hierarchy of a Google search page, the algorithm returns a reference to the search text box. The run-time environment then simulates a user action on this search box.

The NL semantic engine 566 receives the text description of step as input and generates the test object (and action) as output. The algorithm parses the text description in order to extract the step semantics from the text. Parser semantics provide the action type, object type, description, and, optionally, context relation and context description. The algorithm assumes that the input text has the form of a limited number of templates. By way of example, an NL parser or a simpler parse is used for a restricted language. The algorithm then identifies the test object in the semantic hierarchy and matches the object type and the action type. The description keywords are then matched to object attributes, and the context relation is matched to the context object.

The system 500 executes the software testing application 550. Example embodiments discuss two software testing application which use text-based automation as follows:

(1) Text to test: In this use case text tests are originally written at design time. At this time the application is not available. The text test is written using a special editor that validates the syntax of the text, but not the semantics. When the application is developed, the text test is translated to an automation test script. If the text-based automation technology fails on any text step, a quality assurance (QA) person intervenes to revise the text using an editor; alternatively, the QA person can record the step.

(2) Manual test conversion> In this case, a set of manual tests already exists for an application, and the goal is to convert these manual tests to automated test scripts. The conversion is semi-automatic. Text-based automation is able to convert some steps automatically. Other steps use the intervention of a QA person, who can either write more detailed text instructions in an editor, or record the appropriate sequence of steps. Both the text and recorded steps are saved as part of the step description To enable these two software testing applications, a text-based automation application can support off-line editing (FIG. 6A), on-line editing (FIG. 6B), replay (FIG. 6C), replay with recovery (FIG. 6D), and an on-line edit mode (FIG. 6E). In these embodiments, a browser is used as the run-time environment, and the input object representation is DOM.

Figure 6A:
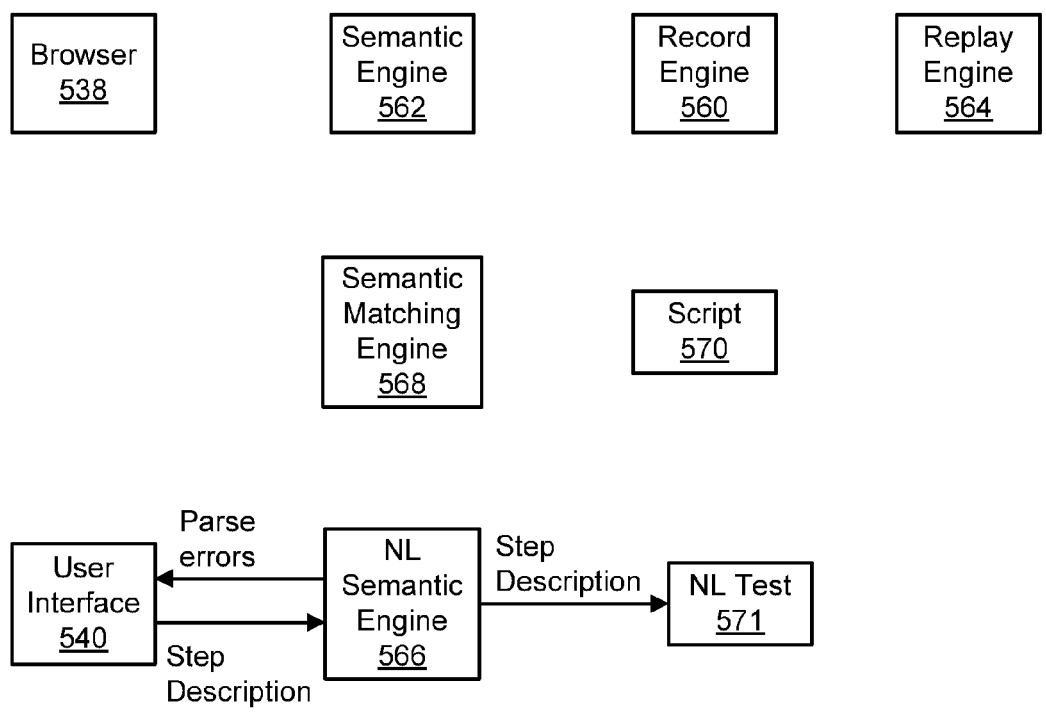
FIG. 6A shows a computer system executing the software testing application during a record operation in accordance with an example embodiment.

FIG. 6A shows a computer system executing the software testing application during an off-line edit operation in accordance with an example embodiment. The user interface 540 allows a user to input a text description of a test step. The text is parsed by the NL semantic engine 566. If the step is parsed successfully it is saved to the NL test 571, otherwise the user is prompted to modify the text description.

Figure 6B:
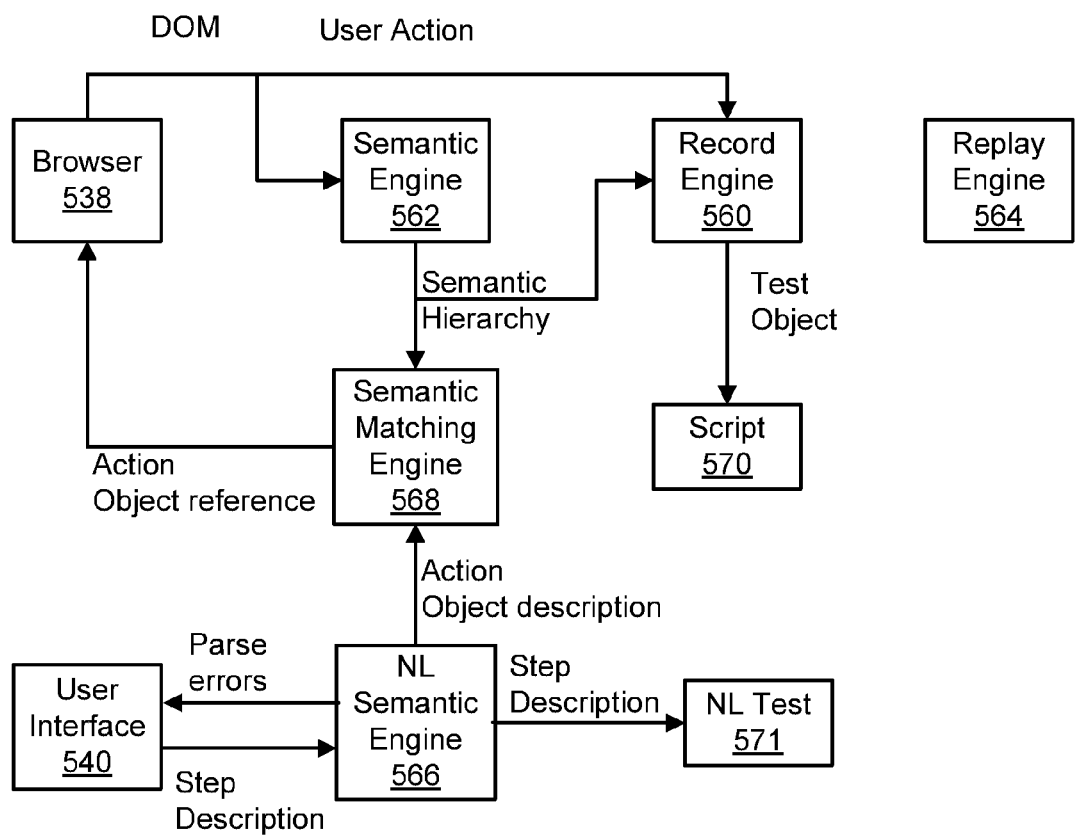
FIG. 6B shows a computer system executing the software testing application during a replay operation in accordance with an example embodiment.

FIG. 6B shows a computer system executing the software testing application during an on-line edit operation in accordance with an example embodiment. The user interface 540 allows a user to input a text description of a test step. The text is parsed by the NL (natural language) semantic engine 566. If the step is not parsed, the user is prompted to modify the text description. The action and UI control description is passed from the NL semantic engine 566 to the semantic matching engine 568. The browser 538 provides the DOM to the semantic engine 562. The semantic engine 562 generates the semantic hierarchy and provides it to the semantic matching engine 568 and the record engine 560. The semantic matching engine finds the test object in the semantic hierarchy and outputs a UI control reference and action to the browser 538. The browser 538 provides the simulated action to the record engine 560, which generates and provides a script step include the test object to the script 570 and NL generator 568 which, in turn, generates and provides the script step description to the user interface 540. Unlike the original text description, the script step description refers to a specific object currently available in the browser.

Figure 6C:
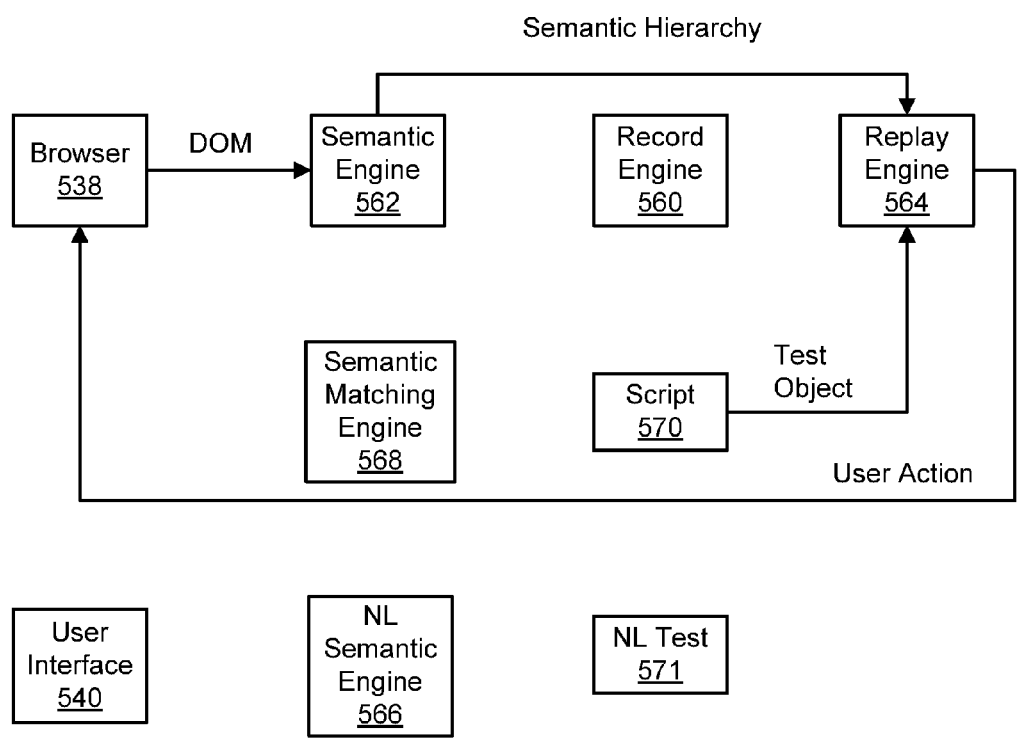
FIG. 6C shows a computer system executing the software testing application during an edit operation in accordance with an example embodiment.

FIG. 6C shows a computer system executing the software testing application during a replay operation in accordance with an example embodiment. The browser 538 provides the DOM to the semantic engine 562 which, in turn, generates and provides the semantic hierarchy to the replay engine 564. The script 570 provides the test action and test object to the replay engine 564. The replay engine generates and provides the user action to the browser 538.

Figure 6D:
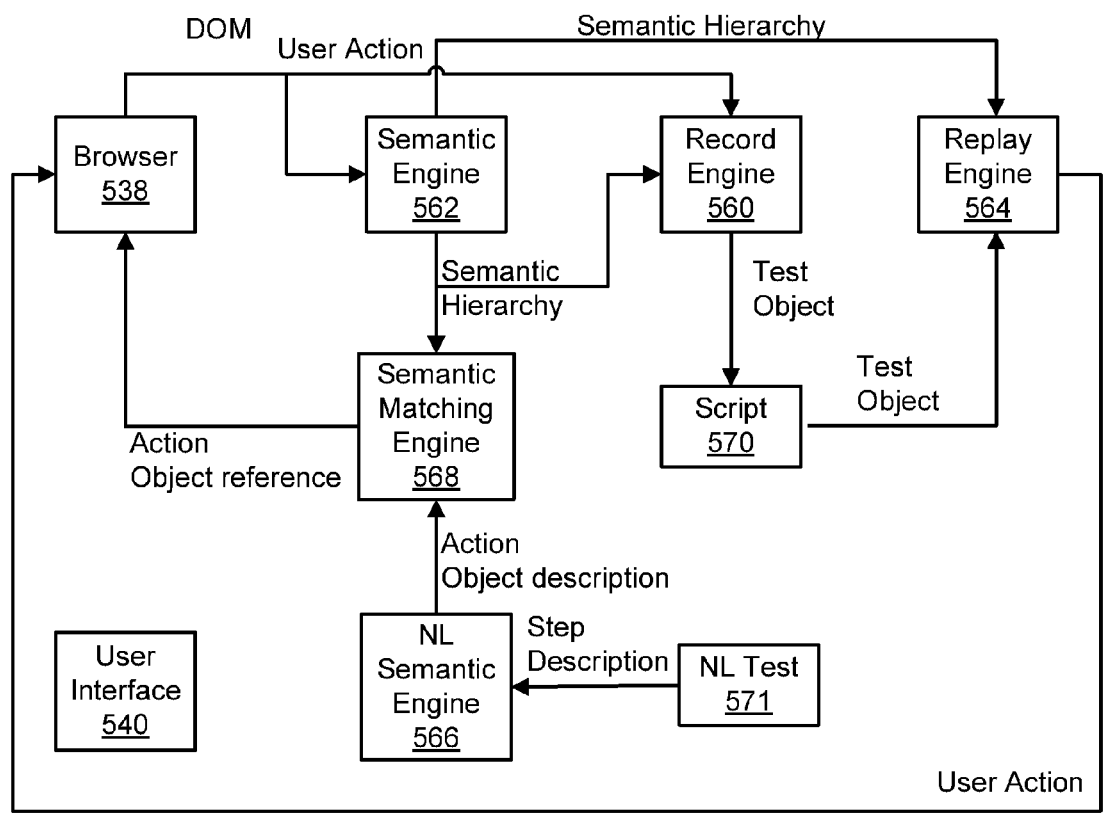
FIG. 6D shows components and operations in record mode to infer a semantic hierarchy from screen captures in accordance with an example embodiment.
Figure 6E:
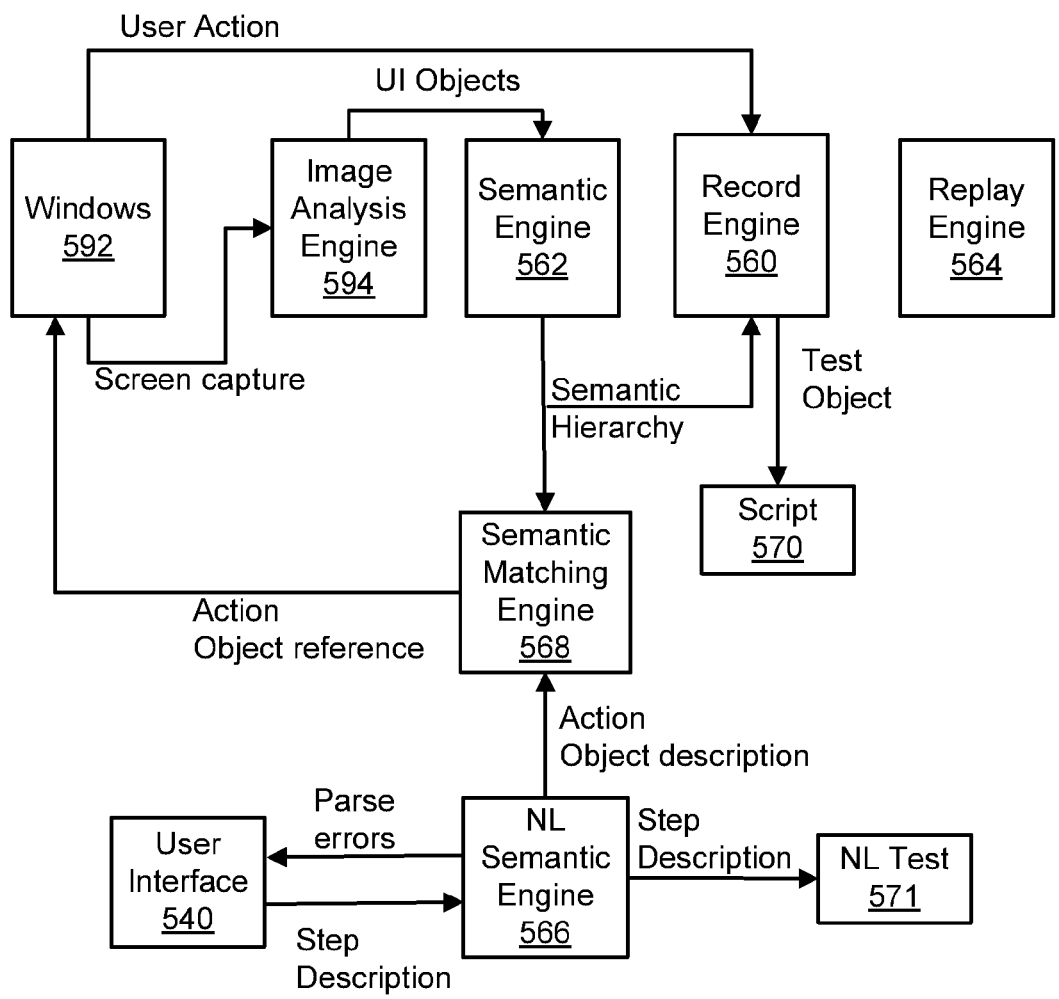
FIG. 6E shows a computer system executing the software testing application in an on-line edit mode in accordance with an example embodiment.

FIG. 6D shows a computer system executing the software testing application during a replay and recovery operation in accordance with an example embodiment. The replay operation proceeds as in the description of FIG. 6C, but the user action provided by the replay engine 564 to the browser 538 fails. The replay engine then initiates a recovery operation, in which the NL test 571 provides the text step description to the NL semantic engine 566, which in turn provides the action and object description to the semantic matching engine 568. The semantic engine 562 provides the semantic hierarchy to the semantic matching engine, which finds the test object and provides the test action and test object to the browser 538. The step is re-recorded by the record engine 560 and the script 507 is updated.

FIG. 6E shows components and operations in on-line edit mode to infer a semantic hierarchy from screen captures. This operation is illustrated with an example embodiment of a Windows run-time environment. The user interface 540 allows a user to input a text description of a test step. The text is parsed by the NL semantic engine 566. If the step is not parsed the user is prompted to modify the text description. The action and UI control description is passed from the NL semantic engine 566 to the semantic matching engine 568. Windows 592 provides a screen capture to an image analysis engine 594 and user action and screen capture to the record engine 560. The image analysis engine 594 provides the UI objects to the semantic engine 562 which, in turn, provides the semantic hierarchy to the record engine 560 and semantic matching engine 568. The record engine 560 provides the test object to the script 570 which then provides the test object to the User Interface 540.

Figure 7:
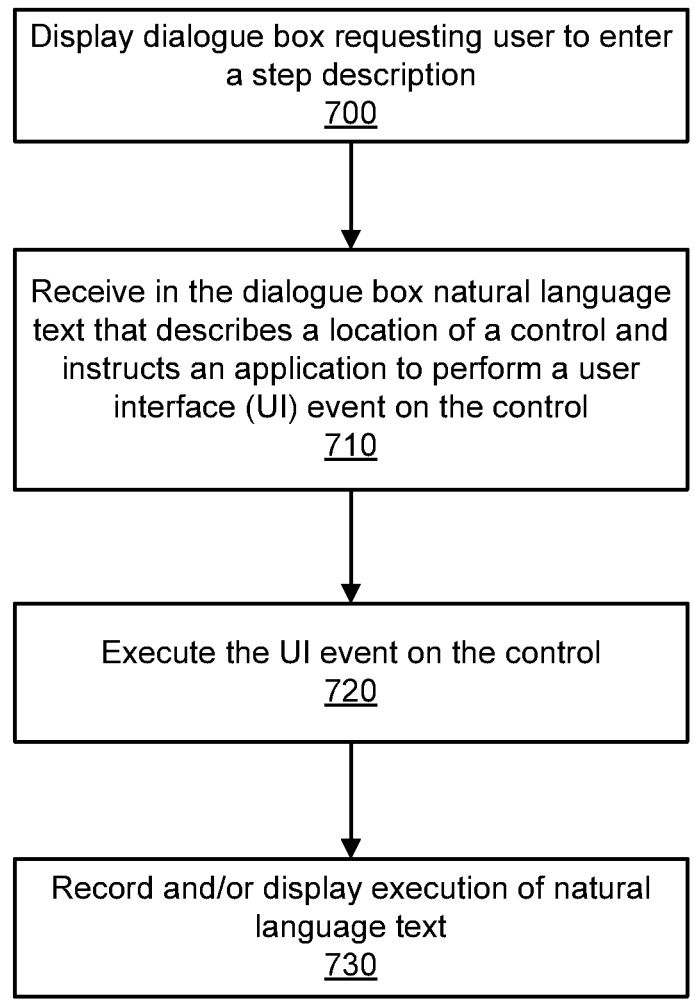
FIG. 7 shows a method for executing the software testing application using natural language in accordance with an example embodiment.
Figure 8:
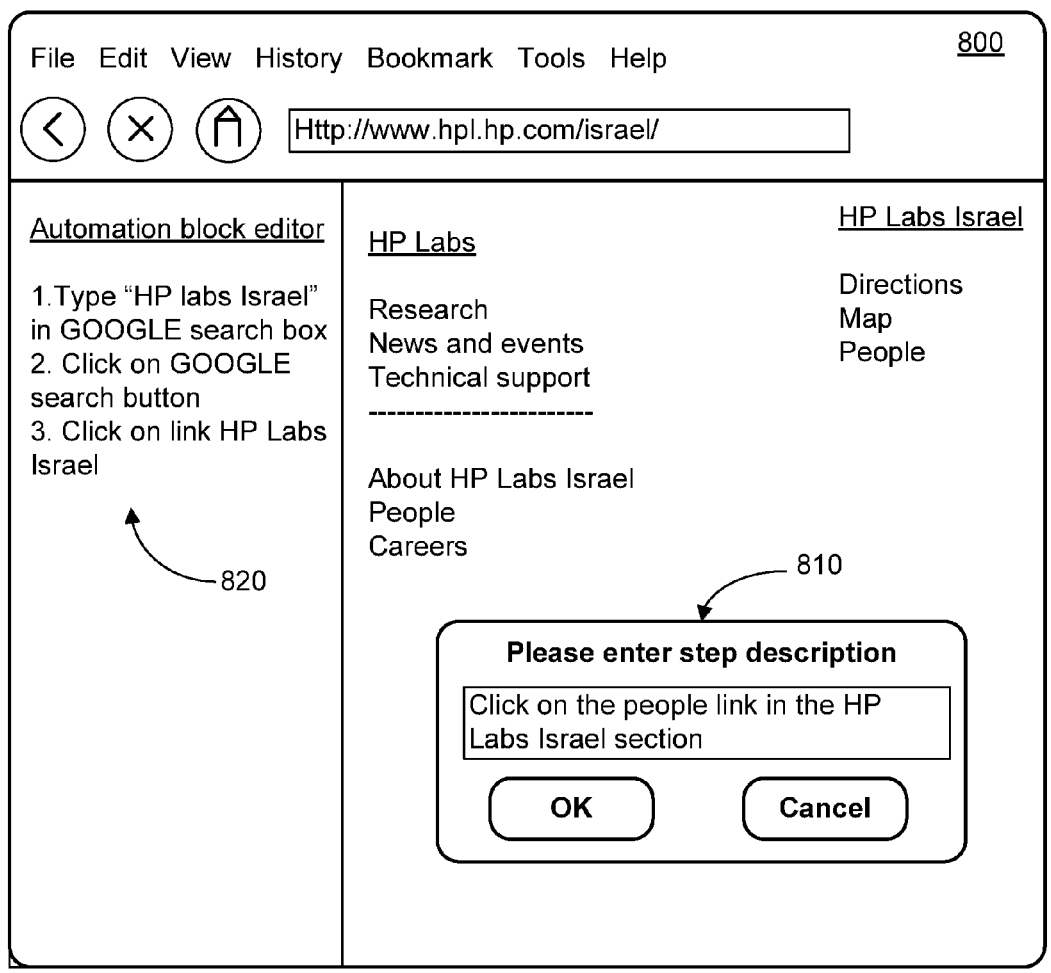
FIG. 8 shows a web page resulting from execution of the method of FIG. 7 in accordance with an example embodiment.

FIG. 7 shows a method for executing the software testing application using natural language, and FIG. 8 shows a web page 800 resulting from execution of this method. FIGS. 7 and 8 are discussed together.

According to block 700, a dialogue box is displayed requesting a user to enter a step description. For example, dialogue box 810 appears on web page 800.

According to block 710, natural language text is received in the dialogue box. The natural language text both describes a location of a control displayed on the web page and instructs the software testing application to perform a UI event on the control. For example, assume the control is a hyperlink "People" displayed on the web page, and the UI event is to click on or activate the hyperlink and navigate to the corresponding web page associated with the hyperlink. Here, the user enters "Click on the people link in the HP Labs Israel section" in the dialogue box 810.

The web page 800 displays two different people links: one people link appears under "HP Labs" on the left side of the web page, and another people link appears under the "HP Labs Israel" section on the right side of the web page. The natural language text description (i.e., Click on the people link in the HP Labs Israel section) provides a sufficient description of the location of the people link for the application to determine that the correct link is located on the right side of the web page under the "HP Labs Israel" section.

According to block 720, the UI instruction in the natural language text entered into the dialogue box is executed. The application "clicks" on the people hyperlink and automatically navigates to the corresponding web page.

According to block 730, execution of the natural language text is recorded or displayed. The application includes a tool 820 that is shown as an automation block editor being displayed on or adjacent the web page 800. This tool records and saves each of the dialogue box executions. As shown in the first execution, the user requested a query search engine to search "HP labs Israel" in a GOOGLE search box. In the second execution, the search button was activated. In the third execution, the user typed "Click on link HP labs Israel" that was displayed per the GOOGLE search. In turn, the application automatically navigated to "http://www.hpl.hp.com/israel/" which is the web page 800 being displayed.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments are provided as examples and should not be construed to limit other embodiments. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as one or more computer-readable or computer-usable storage media or mediums (such as shown at 520 or 530 in FIG. 5). The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Example embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible computer-readable media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles of example embodiments. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
    displaying a graphical user interface (GUI) that includes a control;
    receiving text instructions in a natural language that semantically describe at least two of a location, type, and allowed action of the control on the GUI and instruct an application being developed to perform a user interface (UI) event on the control;
    executing the UI event on the control, and
    testing primitives in the natural language to verify automation steps produce particular results using a natural language test.

2. The method of claim 1 further comprising:
    receiving the text instructions as a set of natural language constructs; and
    associating GUI semantics with the text instructions.

3. The method of claim 1, wherein the text instructions include identification of GUI objects that include a button, a link, a text box, and a window.

4. The method of claim 1, wherein the text instructions include actions of click, type, and move.

5. The method of claim 1, wherein the text instructions include prepositions that describe relations between objects that include left, right above, and below.

6. The method of claim 1 further comprising, constructing a semantic hierarchy from a GUI representation that is one of an object model representation and an image representation.

7. The method of claim 1 further comprising, matching an action and object description to a semantic hierarchy.

8. The method of claim 1 further comprising:
    receiving the texts instructions at an editor;
    analyzing, by the editor, the text instructions to validate semantics assigned to the text instructions.

9. The method of claim 1 further comprising:
    simulating the text instructions on the GUI; and
    recording the text instructions as an automation step; and
    replaying, on a display, the automation step.

10. A non-transitory computer readable storage medium having instructions for causing a computer to execute a method, comprising:
    displaying a first page of an application being developed that includes an object;

receiving a text instruction in a natural language that semantically describes at least two of a location, type, and allowed action of the object on the first page and provides an instruction to execute on the object;

executing the instruction on the object to cause the application to display a second page, and testing primitives in the natural language to verify automation steps produce particular results using a natural language test.

11. The non-transitory computer readable storage medium of claim 10 further comprising, executing the instruction to store language independent tests in a semantic representation.

12. The non-transitory computer readable storage medium of claim 10 further comprising:

receiving the text instruction in a dialogue box displayed on the first page;

executing the text instruction in a search box displayed on the first page.

13. The non-transitory computer readable storage medium of claim 10, wherein the text instruction instructs an application to click on the object and navigate to a web page of a hyperlink associated with the object.

14. The non-transitory computer readable storage medium of claim 10, wherein the text instruction provides a spatial relationship of the object with respect to another object being displayed on the first page.

15. The non-transitory computer readable storage medium of claim 10 further comprising, inferring a hierarchy of objects displayed on the first page by implementing one of image segmentation to locate components of a graphical user interface (GUI), object recognition to classify GUI components of interest, and hierarchical analysis using graph grammars to construct a hierarchy with correct semantics.

16. A computer system, comprising:

a display that displays a graphical user interface (GUI) with an object;

a memory storing instructions; and a processor executing the instructions to:

receive a natural language text instruction that semantically describes at least two of a location, type, and allowed action of the object on the GUI and provides an instruction to execute on the object;

execute the instruction on the object, and test primitives in the natural language test instruction to verify automation steps produce particular results using a natural language test.

17. The computer system of claim 16, wherein the natural language text instruction is human spoken language.

18. The computer system of claim 16, wherein the natural language text instruction includes prepositions that describe a spatial relation of the object with respect to the location on a web page being displayed.

19. The computer system of claim 16, wherein the processor further executes the instructions to consult a thesaurus to determine a meaning of the natural language text instruction.

20. The computer system of claim 16, wherein the natural language text instruction is independent of any particular natural language and enables users to provide instructions in various different languages.

* * * * *

UNITED STATES PATENT AND TRADEMARK OFFICE
CERTIFICATE OF CORRECTION

| | | |
|---|---|---|
| PATENT NO. | : 8,756,571 B2 | Page 1 of 1 |
| APPLICATION NO. | : 12/776043 | |
| DATED | : June 17, 2014 | |
| INVENTOR(S) | : Ruth Bergman et al. | |

It is certified that error appears in the above-identified patent and that said Letters Patent is hereby corrected as shown below:

In the Specification

In column 2, line 48, delete "the".

In the Claims

In column 14, line 49, in Claim 5, delete "right" and insert -- right, --, therefor.

Signed and Sealed this
Thirty-first Day of March, 2015

Michelle K. Lee
*Director of the United States Patent and Trademark Office*